United States Patent [19]

Jahn

[11] Patent Number: 5,397,629
[45] Date of Patent: Mar. 14, 1995

[54] FLUOROPOLYMER COATING COMPOSITION

[75] Inventor: Bernhard Jahn, Obermeitingen, Germany

[73] Assignee: Hoechst Aktiengesellschaft, Frankfurt am Main, Germany

[21] Appl. No.: 81,607

[22] Filed: Jun. 23, 1993

Related U.S. Application Data

[62] Division of Ser. No. 307,516, Feb. 2, 1989, Pat. No. 5,242,962.

[30] Foreign Application Priority Data

Feb. 4, 1988 [DE] Germany .................. 38 03 226.0

[51] Int. Cl.$^6$ .................................................. B32B 7/00
[52] U.S. Cl. ...................................... 428/265; 428/267; 428/290; 428/365; 428/395; 428/421; 428/422; 524/197; 524/86
[58] Field of Search ............... 428/265, 267, 290, 421, 428/422, 365, 395; 524/86

[56] References Cited

U.S. PATENT DOCUMENTS 4,029,585  6/1977  Dettre et al. .................. 428/421
4,778,915  10/1988  Lina et al. .................... 428/421

FOREIGN PATENT DOCUMENTS 63-246243  10/1988  Japan .................. 428/421

*Primary Examiner*—John C. Bleutge
*Assistant Examiner*—Mark D. Sweet

[57] ABSTRACT

Aqueous fluoropolymer formulations containing in finely divided form from 15 to 75% by weight of a fluoropolymer which preferably has at least 40% by weight of tetrafluoroethylene units, from 0.5 to 10% by weight of an organic compound which has at least two, preferably 2–4, isocyanate groups and, optionally, up to 20% by weight of auxiliary or additive substances are prepared and used for coating yarn, in particular sewing yarn, and textile sheet materials.

11 Claims, No Drawings

FLUOROPOLYMER COATING COMPOSITION

This is a division of my application Ser. No. 07/307,516, filed Feb. 2, 1989, now U.S. Pat. No. 5,242,962, issued Sep. 7, 1993.

The present invention relates to an aqueous fluoropolymer formulation and to the preparation thereof, this fluoropolymer formulation making it possible to produce strongly adherent fluoropolymer coatings on textile materials made of organic synthetic fibers.

European Patent Application 0,224,262 discloses laminating textile sheet materials on both sides with a polyvinyl fluoride coating. In this known process, a solution of the polymer in an organic solvent is cast on a conveyor belt into a thin layer which made to gel by heating. The gel layer is then pressed onto the surface of the textile material to be laminated. In this process, the fluoropolymer coating is fixed to the textile material only at the surface and virtually no impregnation of the individual filaments with the fluoropolymer takes place.

German Offenlegungsschrift 3,301,270 discloses a process for sheathing fiber or filament yarns with a fluorine-containing polymer. In this resource-intensive process, the filament to be sheathed is pulled through a central hole in an annular spinneret while at the same time a tube of fluoropolymer is extruded from the annular spinneret. The extruded tube therefore surrounds the filament drawn out of the central hole as a loose-fitting sheath. No firm bonding takes place between the fluoropolymer tube and the filament sheathed therewith.

It is also known for the manufacture of awnings, airhouses, flexible containers and similar products to coat textile sheet structures, usually woven fabrics, preferably those made of synthetic organic fibers or filaments, with polymer materials, usually with polyvinyl chloride (PVC). This coating is effected by impregnating the textile materials in suspensions of polyvinyl chloride in organic liquids. In the course of this coating, even the individual filaments of the textile material become enveloped by the polyvinyl chloride coating. To obtain sufficient adhesion between the polyvinyl chloride coating and the synthetic fibers, the coating is carried out in two stages. First a basecoat is applied comprising a mixture of a PVC paste or suspension with an adhesion promotor; this is followed by the application of a topcoat comprising a pure PVC formulation. The adhesion promotors suitable for this purpose are known. It is usual to use two-component adhesives comprising an organic substance having a plurality of hydroxyl groups, preferably a hydroxyl-containing polyester, and an organic substance having a plurality of isocyanate groups.

It is also already known to coat materials such as threads or sheetlike structures made of organic synthetic fibers with fluoropolymers in order to confer particularly advantageous properties, for example a low co-efficient of friction, a high chemical resistance and a soil-repellent effect, on their surfaces. To this end, the synthetic fiber materials are impregnated or coated with commercially available aqueous dispersions of fluoropolymers and the resulting polymeric coating is fixed by means of a heat treatment.

However, in order to make composite materials based on fluoropolymer-treated synthetic fibers suitable for a wide range of applications, for example the manufacture of membranes for textile construction, flexible containers, conveyor belts, fabric tubes and the like, it is absolutely necessary that the fluoropolymer should show adequate adhesive strength to the synthetic fiber. Adhesive strength is here to be understood as meaning the resistance to separation of base material and coating for a 5 cm wide strip as determined in line with German Standard Specification DIN 53 530. Adequate performance capability of the composite is ensured when, depending on the intended use, adhesion values of from 10 to 15 daN/5 cm are obtained.

However, the production of strongly adherent fluoropolymer coatings of synthetic fiber materials presents even greater difficulties than the production of polyvinyl chloride coatings. This is because it is found that fluoropolymers are far more inert with respect to synthetic fibers, for example polyester fibers, polyamide fibers or aramid fibers, than polyvinyl chloride; that is, they show great reluctance to enter permanent physical or chemical bonds with synthetic fiber surfaces. Moreover, fluoropolymers which, on the basis of the physical data, might be thought suitable for use as coating agents for synthetic fibers are in general commercially available in the form of aqueous dispersions or pastes. It is therefore not possible using these known fluoropolymer dispersions or pastes to produce coatings on synthetic fiber materials showing adequate adhesive strength for all the abovementioned industrial uses.

Nor is it possible to obtain a significant improvement in the adhesion of fluoropolymer coatings by using the one-or two-component adhesion promotors used successfully in the production of PVC coatings.

It has now been found, surprisingly, that it is possible to produce very strongly adherent fluoropolymer coatings on synthetic fibers by applying at least as the first impregnation or as the first coat (basecoat) a fluoropolymer formulation which, in place of conventional adhesion promotors, merely contains an organic compound having a plurality of isocyanate groups.

The present invention thus provides an aqueous fluoropolymer formulation containing in finely divided form from 15 to 75% by weight, preferably from 25 to 60% by weight, of a fluoropolymer, from 0.5 to 10, preferably from 1 to 5% by weight of an organic compound which has at least two, preferably 2 to 4, isocyanate groups and, optionally, up to 20% by weight, preferably up to 10% by weight, of auxiliary or additive substances.

The fluoropolymers of the formulation according to the invention contain to an extent of at least 40% tetrafluoroethylene units and to an extent of up to 60% units derived from other unsaturated fluorine-containing monomers copolymerizable with tetrafluoroethylene. Advantageously, the amounts and identities of the fluorine-containing monomers copolymerized with the tetrafluoroethylene are chosen in such a way that the copolymer has the desired mechanical properties, such as strength, flexibility, elasticity, low slip friction and the like, and also good chemical resistance. More particularly, the composition should be chosen in such a way that the fluoropolymer is readily dispersible in water and also gives dispersions of good long term stability. Preference here is given to those fluoropolymers whose melting points are below the melting point of the synthetic fibers to be finished with the formulation. More particularly, fluoropolymers of advantage here are those whose melting points are from 5° to 50°, preferably from 20° to 40° C., below the melting point of the synthetic fibers to be finished.

High suitability within the meaning of the above specifications is possessed by tetrafluoroethylene copolymers containing to an extent of up to 60% units derived from hexafluoropropylene and vinylidene fluoride. A fluoropolymer particularly suitable for preparing the fluoropolymer formulation according to the invention contains from 40 to 60% by weight of tetrafluoroethylene units, from 10 to 30% by weight of hexafluoropropylene units and from 20 to 40% by weight of vinylidene fluoride units.

The preparation of such fluoropolymers is known, and numerous representatives of this class of compounds are commercially available. Particularly high suitability for the preparation of the fluoropolymer formulation according to the invention and for producing strongly adherent fluoropolymer coatings on synthetic fibers is possessed by the range of ®Hostaflon TFB products available from Hoechst AG.

Organic compounds which have a plurality of isocyanate groups and which can be incorporated as adhesion promotors into the fluoropolymer formulations according to the invention are known in large numbers, and numerous representatives of this class of compounds are commercially available. A number of industrially important tri- and polyisocyanates which are also suitable for the use according to the invention may be found for example in Ullmann's Enzyklopädie der technischen Chemie, 4th edition, Volume 13, page 355, Volume 15, page 634 and Volume 19, pages 303 and 304. It is of course also possible to use other di- and polyisocyanates which are dispersible and sufficiently stable in aqueous systems in the fluoropolymer formulations according to the invention. Preferred di- and polyisocyanates are for example the isomeric 2,4-diisocyanatotoluenes and mixtures thereof, 1,5-diisocyanatonaphthalene, diisocyanatodiphenylmethane and its technical-grade isomer mixtures, dimerized and trimerized diisocyanatotoluene, and adducts of diisocyanatotoluene with trimethylolpropane and tris[isocyanatohexyl]biuret. Particular preference for use in the fluoropolymer formulations according to the invention is given to the aforementioned derivatives of diisocyanatotoluene, in particular its dimerization product, which is available from Bayer AG under the name ®Desmodur TT.

As additives there may be present in the fluoropolymer formulations according to the invention various auxiliary and additive substances. These include in particular surface-active agents (surfactants) which may serve as wetting agents in the preparation of formulations and in their application and dispersants which facilitate and/or make possible the dispersion of fluoropolymers and cyanato-containing compounds in the aqueous phase and increase dispersion stability. Again such surface-active agents are described in the literature in large numbers.

We cite for example Ullmann's Enzyklopädie der technischen Chemie, 4th edition, Volume 22, pages 455 et seq., in particular pages 466 and 488 and also Volume 23, page 120. It is possible to use for example anionic, cationic or amphoteric surfactants, but preferably nonionic surfactants derived from ethoxylates, terminally blocked ethoxylates, fatty acid esters and polyhydroxy compounds. The possibilities also include silicone-based surfactants or fluorosurfactants. If a novel fluoropolymer formulation having a relatively low fluoropolymer concentration and a correspondingly low viscosity is to be used, it can be advantageous also to add as an auxiliary and additive substance a thickening or antimigration agent, for example agents from the group of the carboxymethylated polysaccharides, xanthans or alginates, of the starch or cellulose derivatives, of the acrylate copolymers or of polyvinyl alcohol. Even inorganic thickening agents such as pyrogenic silica or bentonites may be incorporated into the fluoropolymer formulation according to the invention in low concentration.

For specific applications, in particular for the topcoat, it is also possible to use mixtures of formulations according to the invention with blend components specific to the intended use. Such blend components are for example pigments, fillers, flame-retardant agents and modifying agents which are capable of modifying the properties of the fluoropolymer coating, for example plasticizers, lubricants or agents which modify the surface properties. These can be incorporated into the formulations according to the invention in a total amount of up to 25% by weight, preferably up to 15% by weight. However, it is advantageous not to use this second group of additives in formulations according to the invention which are to be used in the first coat (the basecoat).

It is of course advantageous and particularly preferable to choose the amount of the auxiliary or additive substances in the fluoropolymer formulations according to the invention in such a way that the effect intended with these additives is obtained to an optimum degree.

The fluoropolymer formulation according to the invention is prepared in a conventional manner by homogenizing, if 100 parts by weight of the formulation are to be prepared, from 15 to 75 parts by weight of fluoropolymer, from 0.5 to 10 parts by weight of the organic compound having at least two isocyanate groups and, optionally, up to 20 parts by weight of further auxiliary or additive substances in finely divided form with sufficient water to make up to 100 parts by weight, in a suitable mixing apparatus. If the fluoropolymers used here are solid, they must first be converted into a very finely divided form and then by vigorous stirring or kneading into a uniform dispersion or paste in the requisite amount of water, if necessary with the addition of a sufficient amount of dispersing auxiliaries and/or wetting agents. At the same time or thereafter the requisite amount of the selected organic compound containing a plurality of cyanate groups is added.

The mixing operation is advantageously carried out at room temperature or at an only moderately elevated temperature. Further additive or auxiliary substances may be added to the blend batches from the start, or they may be incorporated once a stable fluoropolymer dispersion or paste has been obtained.

It is advantageous to prepare the fluoropolymer formulations according to the invention by incorporating into an aqueous fluoropolymer suspension or fluoropolymer paste which may contain further auxiliary or additive substances from 0.5 to 10% by weight, based on the final weight of the mixture, a finely divided form of the organic substance which contains at least two isocyanate groups, and homogenizing it. Aqueous fluoropolymer suspensions or pastes which are highly suitable for producing the formulations according to the invention are for example the commercially available ®Hostaflon TFB range mentioned above.

Textile materials for the purposes of this invention can be one- or two-dimensional; that is, they are threads or else sheetlike structures, for example woven fabrics, knitted fabrics, laid fabrics or nonwoven fabrics of various thicknesses, or even laminates of identical or different sheetlike structures of this type, possibly combined with other raw materials.

The filaments or fibers of the textile materials to be coated can be dyed or undyed, smooth or textured. There is no evidence that commercial textile dyes migrate out of the synthetic fibers into the fluoropolymer coating.

In principle, the fluoropolymer formulation according to the invention can be applied in one operation to the synthetic fiber material to be coated. To produce thicker fluoropolymer coats, the fluoropolymer formulation according to the invention is advantageously applied in a plurality of operations, in which case, depending on the chosen composition of the formulation and the associated consistency, an impregnation by dipping or padding or alternatively a paste application, for example by knife-coating or roller-coating, may be carried out. In this advantageous application of the formulation according to the invention it is particularly advantageous to carry out the first application, i.e. the production of the basecoat, with a fluoropolymer formulation according to the invention which, aside from th e organic compound having a plurality of isocyanate groups, contains no or only little other additives, in particular no solid additives, for example pigments or flame-retardant additives.

It is also possible to prepare fluoropolymer coatings on organic synthetic fibers by using the fluoropolymer formulation according to the invention only to prepare the basecoat and to use for the basecoat or basecoats a normal aqueous fluoropolymer dispersion or paste which is free of isocyanato-containing organic compounds but which, of course, may contain further additives, for example dispersants, wetting agents, pigments, flame-proofing agents or other filling and auxiliary substances.

As stated above, it is also possible to carry out the fluoropolymer finish using the fluoropolymer formulation according to the invention in a single step, for example by impregnating, this being advantageous in particular in the application to threads made of synthetic filaments or fibers. In the application of the fluoropolymer formulation according to the invention, each application by impregnation or coating is in general followed by a heat treatment of the material to dry the application and to fix the freshly applied fluoropolymer to the substrate.

The fluoropolymer coatings applied by the above-specified application methods have a high adhesive strength of at least 10 daN/5 cm, on use of preferred formulations according to the invention in general more than 20 daN/5 cm. The adhesive strength of the fluoropolymer to the synthetic fiber can be controlled by the amount which is added of the organic compound containing two or more isocyanate groups. Furthermore, the adhesive strength can be influenced by the temperature and duration of the heat treatment carried out following application of the formulation according to the invention.

The present invention also provides the textile sheet materials, for example woven fabrics, knitted fabrics, laid fabrics or nonwoven fabrics made of synthetic fibers, preferably polyesters, polyamide or aramid fibers, in particular polyester fibers, which are coated with the fluoropolymeric formulation according to the invention. Textile sheet materials for the purposes of the present invention also include laminates of identical or different sheetlike structures, including any mixtures with other raw materials. The coated sheetlike structures are notable for having, at least in the fluoropolymer layer directly adjoining the fiber surface, one or more adhesion-promoting constituents derived from an organic compound having at least two isocyanate groups. Furthermore, the fluoropolymer-coated synthetic fiber textile materials according to the invention are notable for the fact that the coating has an adhesive strength, as measured in line with German Standard Specification DIN 53 530, of at least 10 daN/5 cm. Owing to the high mechanical strength properties of polyester, polyamide or aramid fibers, the materials which have been fluoropolymer-coated according to the invention also have excellent mechanical strength values which very much widen their range of possible industrial uses. Moreover, the coated materials have low coefficients of friction, show high chemical resistance and are soil-repellent.

The present invention further provides the synthetic fiber threads coated with the fluoropolymer formulation according to the invention. The term threads is here to be understood as meaning monofilaments, multifilament yarns or even staple fiber yarns. Suitable fiber material here too comprises in particular polyester, polyamide or aramid synthetic fibers, preferably polyester fibers. The fluoropolymer-coated yarns thus obtained have not only the high mechanical strength values characteristic of synthetic fibers but also a particularly high-slip, chemically resistant and soil-repellent surface.

The fluoropolymer formulations according to the invention prove particularly useful for the bonding of sewing yarn. This is to be understood as meaning that the fluoropolymer coating brings about a flexible bond between the individual filaments of the yarn. The bonded sewing yarns thus produced have a particularly high strength and excellent sewing properties. A particular advantage here is that the bonding action of the extremely inert fluoropolymer coating does not disappear on dyeing or on application of sewing finishes.

The threads coated according to the invention and the bonded sewing yarn are also notable for the fact that they have, at least in the fluoropolymer layer immediately adjoining to the fiber surface, one or more adhesion-promoting constituents which are derived from an organic compound having at least two isocyanate groups and that the fluoropolymer coating has such adhesive strength that it does not become detached due to mechanical stress such as is experienced in the further processing of the threads or in the course of the intended use of the sewing yarn, for example in the course of winding, weaving or knitting or in the course of sewing.

The working examples that follow illustrate the preparation of the fluoropolymer formulation according to the invention and its application to yarn and textile sheet materials.

EXAMPLE 1

500 g of a commercially available 50% strength by weight aqueous paste of a fluorocopolymer of tetrafluoroethylene, hexafluoropropylene and vinyl difluoride (®Hostaflon TFB X 7900 from Hoechst AG) containing 2% by weight of a thickener based on an acrylate polymer and 15 g of a finely pulverulent 1,3-bis-(4-methyl-3-isocyanatophenyl)-1,3-diazacyclobutane-2,4- dione (for example Desmodur TT from Bayer AG) are kneaded for 15 minutes in a kneader at 20°–25° C. and packaged. This gives a pasty fluoropolymer formulation which is highly suitable for coating textile materials (yarn or textile sheet material) made of synthetic fibers. It contains 48.5% by weight of fluoropolymer, 2.9% by weight of the diisocyanato compound and 1.9% by weight of thickener. The formulation can also be used to good effect as a primer coating in the coating of textile materials onto which firmly adherent fluoropolymer topcoats can be applied by means of commercially available fluoropolymer pastes or dispersions.

EXAMPLE 2

10 g of wetting and dispersing agent based on an ethoxylated alkylphenol are dissolved with vigorous stirring in 315 ml of demineralized water at 40° C. 175 g of a finely ground fluorocopolymer of 55% by weight of tetrafluoroethylene, 15% by weight of hexafluoropropylene and 30% by weight of vinylidene fluoride are then slowly introduced with stirring. Stirring is continued until the dispersion is completely homogenized, and the dispersion is then packaged. The 35% strength by weight aqueous fluoropolymer formulation obtained is highly suitable for the dip impregnation and the coating of textile sheet materials and in particular yarns made of synthetic fibers.

EXAMPLE 3

Coating of woven polyester fabric

A 220 g/m$^2$ woven polyester fabric with 9 ends and 9 picks of 1100 dtex per cm is initially provided with the following basecoat:

A fluoropolymer paste according to Example 1 is applied to both sides of the fabric, in each case at a rate of 60–80 g/m$^2$, by spread coating by means of an air knife or a rubber blanket doctor blade.

The material is then sintered at 210° C. for 2 minutes. Topcoating is effected with a 50% strength ®Hostaflon TFB X 7900 paste (aqueous fluoropolymer paste) which, if desired, may additionally be pigmented or flameproofed (for example by the addition of 5% of TiO$_2$ and/or 10% of Sb$_2$O$_3$, based on solid fluoropolymer). This formulation is applied by spread coating with a steel roll doctor or rubber blanket doctor blade in a plurality of coats (for example 6 coats on the front, 4 coats on the back), each coat being followed by an intermediate drying at 210° C. for 2 minutes.

The total amount applied to the front of the fabric is 300 g/m$^2$ and to the back of the fabric 160 g/m$^2$.

After the last coat has been applied, the fabric is sintered at 210° C. in the course of a residence time of 10 minutes. Thereafter the surface of the front is embossed by means of a calender.

The adhesive strength obtained is 20.7 daN/5 cm.

If this example is repeated exactly as described above with a fluoropolymer paste which contains no dicyanato compound but which otherwise has the composition of the paste prepared in Example 1, an adhesive strength of 9.1 daN/5 cm is found on the front of the coated fabric and an adhesive strength of 6.9 daN/5 cm on the back.

EXAMPLE 4

Fabric: as in Example 3.
Basecoat: as in Example No. 3, the basecoat being sintered at 210° C. in the course of a residence time of 10 minutes.

Topcoating: as in Example 3.
Adhesive strength obtained: 30.2 daN/5 cm.

EXAMPLE 5

Fabric: as in Example 3.
Basecoat: as in Example No. 4.
Topcoating: Formulation: Hostaflon TFB X 7100 Melt granules+5% of TiO$_2$+10% of Sb$_2$O$_3$+1% of Hoechst Wax OP. Application method: roll melt unit. Amount applied: front 300 g/m$^2$ back 160 g/m$^2$. Processing conditions: Roll temperatures: 205° C., Preheat roll: 150° C., IR radiator: 90%, Machine speed: 3 m/minute, Rubber roll pressure: 7 bar, Film weight: front 300 g/m$^2$, back 160 g/m$^2$.

Adhesive strength obtained: 21.5 daN/5 cm.

EXAMPLE 6

Bonding of a sewing thread

A black 266-dtex 64-filament 3-ply polyethylene terephthalate yarn is impregnated with 15–20% by weight (dry add-on based on weight of fiber) of a formulation as described in Example 2 by dipping.

The impregnated thread is then heat-treated in a hot oven at 220° C. for at least 60 seconds. The sewing thread obtained does not show a change in hue, nor any migration of the dye into the bending. It produces very good sewing results even under high stress, for example in industrial sewing machines. No abrasion takes place either in winding or in sewing, nor, following prolonged storage in bobbin form, is there any adhesive coalescing of yarn layers.

In the same way, the above-described dip impregnation can also be effected with a commercially available 35% strength fluoropolymer dispersion (®Hostaflon TFB X 7100 from Hoechst AG) into which. 1.5% by weight of 1,3-bis-(4-methyl-3-isocyanatophenyl)-1,3-diazacyclobutane-2,4-dione (for example ®Desmodur TT from Bayer AG) has been homogeneously incorporated beforehand.

To test the quality of the sewing thread produced, it is subjected to a tough sewing test such as that described in DE Offenlegungsschrift 3,431,834.

In this test, the thread is used in sewing under the following conditions: industrial sewing machine Pfaff 363, stitch length 1 mm, zigzag seam 8 mm width, 3,250 cycles/minute, 200 cN pre-tension, 4 layers of cotton twill. The thread bonded according to the invention permits in this test on average over 4,000 stitches without thread breakage, while an unbonded thread permits on average only about 300 stitches.

I claim:

1. A textile sheet coated or bonded with at least one fluoropolymer layer, the layer immediately adjoining the surface of the sheet being prepared from a formulation. comprising a fluoropolymer and an adhesion-promoting constituent selected from the group consisting of 1,5-diisocyanatonaphthalene, dimerized or trimerized diisocyanatoluene, and adducts of diisocyantoluene with trimethylpropane and tris-[isocyanatohexyl]biuret, the adhesive strength of the layer to the sheet being at least 10 daN/5 cm as determined by DIN 53 530.

2. The sheet of claim 1, wherein the sheet is comprised of synthetic fibers.

3. The sheet of claim 1, wherein the sheet is coated with additional fluoropolymer layers.

4. The sheet of claim 1, wherein the fluoropolymer is a fluorocopolymer containing at least 40% tetrafluoroethylene units.

5. The sheet of claim 1 wherein the adhesion promoting constituent is a dimerized diisocyanatotoluene.

6. The sheet of claim 5 wherein the dimerized diisocyanatotoluene is a uretdione of diisocyanatotoluene.

7. A yarn comprising synthetic fibers or filaments coated with a fluoropolymer layer, the layer being prepared from a formulation comprising a fluoropolymer and an adhesion-promoting constituent selected from the group consisting of 1,5-diisocyanatonaphthalene, dimerized or trimerized diisocyanatoluene, and adducts of diisocyantoluene with trimethylpropane and tris-[isocyanatohexyl]biuret, the adhesive strength of the layer to the yarn being sufficient to withstand mechanical stress when the yarn is further processed.

8. The yarn of claim 7, wherein the fluoropolymer is a fluorocopolymer containing at least 40% tetrafluoroethylene units.

9. The yarn of claim 7, wherein the adhesion promoting constituent is a dimerized diisocyanatotoluene.

10. The yarn of claim 9, wherein the dimerized diisocyanatotoluene is a uretdione of diisocyanatotoluene.

11. The yarn of claim 7, wherein the yarn is a sewing yarn.

* * * * *